(12) United States Patent
Kim et al.

(10) Patent No.: US 11,813,895 B2
(45) Date of Patent: Nov. 14, 2023

(54) TIRE WEAR MEASURING APPARATUS USING IRREGULARITY OF TIRE ACCELERATION SIGNAL AND TIRE WEAR MEASURING METHOD USING SAME

(71) Applicants: Hankook Tire & Technology Co., Ltd., Seongnam-si (KR); Korea Advanced Institute of Science and Technology, Daejeon (KR)

(72) Inventors: Min Tae Kim, Daejeon (KR); Ho Jong Lee, Daejeon (KR); Sei Bum Choi, Daejeon (KR); Da Sol Jeong, Seoul (KR); Jong Hyup Lee, Uijeongbu-si (KR)

(73) Assignees: Hankook Tire & Technology Co., Ltd., Seongnam-si (KR); Korea Advanced Institute of Science and Technology, Daejeon (KR)

( * ) Notice: Subject to any disclaimer, the term of this patent is extended or adjusted under 35 U.S.C. 154(b) by 505 days.

(21) Appl. No.: 17/061,292

(22) Filed: Oct. 1, 2020

(65) Prior Publication Data
US 2021/0101415 A1    Apr. 8, 2021

(30) Foreign Application Priority Data

Oct. 2, 2019 (KR) .......................... 10-2019-0122342

(51) Int. Cl.
*B60C 11/24* (2006.01)
*B60C 19/00* (2006.01)
*G01M 17/02* (2006.01)

(52) U.S. Cl.
CPC ............ *B60C 11/246* (2013.01); *B60C 19/00* (2013.01); *G01M 17/025* (2013.01); *B60C 2019/004* (2013.01)

(58) Field of Classification Search
CPC ....................................................... B60C 11/246
See application file for complete search history.

(56) References Cited

U.S. PATENT DOCUMENTS

8,061,191 B2    11/2011    Hanatsuka
8,483,976 B2    7/2013    Morinaga
(Continued)

*Primary Examiner* — Michael A Berns
(74) *Attorney, Agent, or Firm* — Knobbe, Martens, Olson & Bear, LLP (57) ABSTRACT

Provided is a technique of quantifying a change in irregularity appearing in an acceleration signal of a tire and measuring a tread wear amount of the tire using the quantified change. A tire wear measuring apparatus according to an embodiment of the present disclosure includes: a signal receiver configured to measure an acceleration inside a tire with respect to an axial direction, which is a radial direction of the tire, at a plurality of points inside the tire; a broad pass filter configured to receive a measured acceleration signal from the signal receiver and perform filtering as a preprocessing on the acceleration signal to generate a processed signal; a signal analyzer configured to estimate a tread wear rate of the tire by quantifying an irregularity of the acceleration signal using the processed signal that is a signal filtered through the broad pass filter; a transmitter configured to receive analysis information, which is information on the tread wear rate of the tire, from the signal analyzer and transmit the analysis information; and a control module configured to receive the analysis information from the transmitter and generate a control signal for a vehicle on which the tire is installed.

10 Claims, 7 Drawing Sheets

(56) References Cited

U.S. PATENT DOCUMENTS

| | | | | |
|---|---|---|---|---|
| 9,636,955 | B2* | 5/2017 | Singh | G01K 13/08 |
| 9,821,611 | B2* | 11/2017 | Singh | B60C 23/02 |
| 11,458,782 | B2* | 10/2022 | Kretschmann | B60W 40/10 |
| 2015/0360525 | A1 | 12/2015 | Singh et al. | |
| 2017/0113495 | A1 | 4/2017 | Singh | |
| 2021/0101415 | A1* | 4/2021 | Kim | B60C 11/243 |
| 2021/0101416 | A1* | 4/2021 | Kim | G01M 17/02 |
| 2021/0101417 | A1* | 4/2021 | Kim | G01M 17/02 |
| 2021/0237517 | A1* | 8/2021 | Suzuki | B60C 11/246 |
| 2023/0011981 | A1* | 1/2023 | Tyagi | H04Q 9/00 |

* cited by examiner

FIG. 1

20a →  • Normal tread pattern(Hankook tire – H426) : 60~180 patterns

20b →  • Lateral pattern : 30 patterns

20c →  • Smooth tire

TIRE WEAR MEASURING APPARATUS USING IRREGULARITY OF TIRE ACCELERATION SIGNAL AND TIRE WEAR MEASURING METHOD USING SAME

CROSS-REFERENCE TO RELATED APPLICATION

This application claims priority to Korean Patent Application No. 10-2019-0122342, filed Oct. 2, 2019, the disclosure of which including the specification, the drawings, and the claims is hereby incorporated by reference in its entirety.

BACKGROUND

Field

The present disclosure generally relates tires, and more particularly to a tire wear measuring apparatus and a tire wear measuring method using the same.

Description of the Related Art

Among the components of a vehicle, tires are the only components contacting a road surface and are directly related to the vehicle's turning and braking performance. If tires are worn, the turning and braking performance may not be properly implemented. Thus, worn tires may be directly related to the vehicle's safety. Specifically, if a braking distance on a wet road surface increases due to the wear of the tire, it may directly lead to a vehicle accident.

Accordingly, research and development of a system which measures the wear rate of tire tread and the like in real time and automatically informs the replacement time of tires according to the wear rate of tires are being actively conducted.

In U.S. Patent Application Publication No. 2017-0113495 (Title: Indirect tire wear state estimation system), load of a vehicle is inferred and then a wear rate according to a distance travelled is estimated based on the load of the vehicle. However, it is inefficient since information on too many factors is required to estimate the wear rate. In addition, in U.S. Pat. No. 8,483,976 (Title: Method for estimating tire wear and apparatus for estimating tire wear) and U.S. Pat. No. 8,061,191 (Title: Method and apparatus for detecting wear of tire), a wear rate of a tire is measured by a method using sensing of a tire. However, it is difficult to expect consistent results. Further, actual vehicle operating conditions are not considered, resulting in a limitation in determining accurate tire wear under actual conditions.

SUMMARY

The present disclosure generally relates tires, and more particularly to a tire wear measuring apparatus using irregularity of an acceleration signal and a tire wear measuring method using the same, including a technique of quantifying a change in irregularity appearing in an acceleration signal of a tire and measuring a wear amount of a tire tread using the quantified change.

One object of one or more aspects of the present disclosure for solving the above problems is to measure a wear amount of a tire tread using irregularity of tire acceleration signals according to an increase in wear of the tire.

The technical objects to be achieved by the present disclosure are not limited to as described-above, and other technical objects which are not described will be clearly understood by a person who has ordinary knowledge in a technical field to which the present disclosure pertains from the following description.

A configuration of the present invention for achieving the above objects includes: a signal receiver configured to measure acceleration inside a tire with respect to an axial direction, which is a radial direction of the tire, for each of a plurality of points inside the tire; a broad pass filter configured to receive the measured acceleration signal from the signal receiver and perform filtering as a preprocessing on the acceleration signal; a signal analyzer configured to estimate a tread wear rate of the tire by quantifying irregularity of the acceleration signal using a processed signal that is a signal filtered through the broad pass filter; a transmitter configured to receive analysis information, which is information on the tread wear rate of the tire, from the signal analyzer and transmit the analysis information; and a control module configured to receive the analysis information from the transmitter and generate a control signal for a vehicle to which the tire is installed.

In one embodiment of the present disclosure, the signal analyzer may be further configured to quantify the irregularity of the acceleration signal by quantifying the irregularity of the processed signal using the following equation according to Euclidean distance analysis:

$$U=\sqrt{\sum_{i=1}^{n}(x_{i,j}-x_{i,j-1})}$$

In another embodiment of the present disclosure, the signal analyzer may be further configured to determine that a tread wear rate of the tire is increased when the number of Euclidean distances increases.

In yet another embodiment of the present disclosure, the control module may include a vehicle controller configured to control the vehicle and an information transmitter configured to receive the analysis information from the transmitter and transmit the analysis information to the vehicle controller. The vehicle controller may be further configured to determine a replacement time of the tire using the analysis information.

In further embodiment of the present disclosure, the control module may further include a display configured to display the replacement time of the tire or information on a service of replacing the tire.

A configuration of the present invention for achieving the above objects includes: a first step of measuring an acceleration inside the tire with respect to an axial direction for each of a plurality of points inside the tire; a second step of generating the processed signal by performing filtering as a preprocessing on the acceleration signal; a third step of estimating a tread wear rate of the tire by quantifying irregularity of the acceleration signal using the processed signal; a fourth step of determining a replacement time of the tire using information on the tread wear rate of the tire; and a fifth step of transmitting information on the replacement time of the tire to a user of a vehicle and an external integrated control system connected to the vehicle.

BRIEF DESCRIPTION OF THE DRAWINGS

Hereinafter, the present disclosure will be described with reference to the accompanying drawings. However, the present disclosure can be implemented in various different forms and is not limited to the embodiments described herein. To clearly describe the present disclosure, parts irrelevant to the description will be omitted in the drawings, and like elements will be designated by like numerals throughout the specification.

DETAILED DESCRIPTION

In this specification, when a part is referred to as being "connected" to another part, it may not only be "directly connected" but also may be "electrically connected" to the other part via an element disposed therebetween. Also, when a part is referred to as "including" an element, this means that the part does not exclude another element and may further include another element unless stated otherwise.

The terminology used herein is merely for the purpose of describing particular embodiments and is not intended to limit the invention. A singular form is intended to include a plural form as well, unless the context clearly indicates otherwise. It will be further understood that the terms "comprises" and/or "comprising," when used in this specification, specify the presence of stated features, integers, steps, operations, elements, components, and/or combinations thereof but do not preclude the presence or addition of one or more other features, integers, steps, operations, elements, components, and/or combinations thereof.

Hereinafter, the present disclosure will be described in detail with reference to the accompanying drawings.

Figure 1:
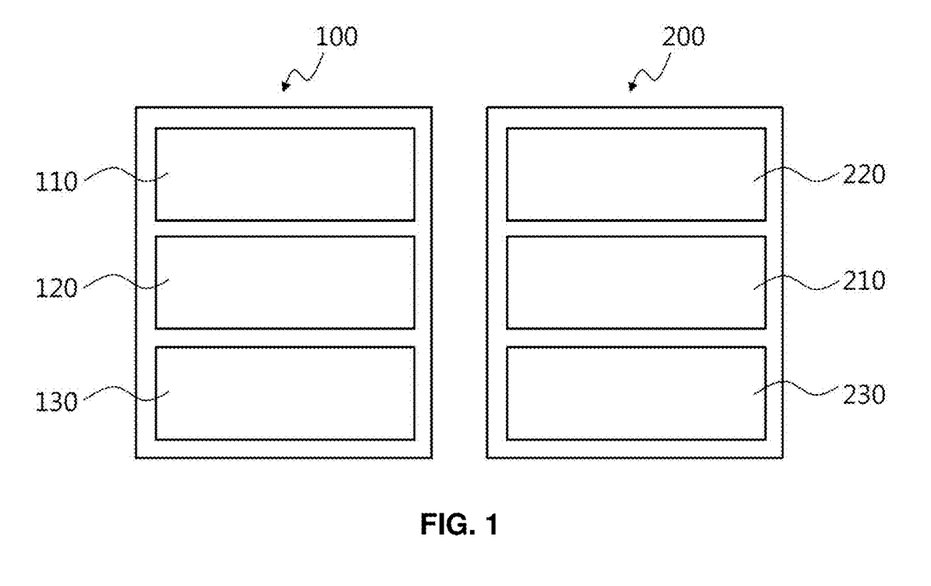
FIG. 1 is a schematic diagram of a configuration of a tire wear measuring apparatus according to an embodiment of the present disclosure.

FIG. 1 is a schematic diagram of a configuration of a tire wear measuring apparatus according to an embodiment of the present disclosure. As shown in FIG. 1, the tire wear measuring apparatus includes: a signal receiver 110 for measuring an acceleration of the inside of a tire in the axial direction, which is the radial direction of the tire, for each of a plurality of points inside the tire; a broad pass filter for receiving the measured acceleration signal from the signal receiver 110 and performing filtering as a preprocessing for the acceleration signal; a signal analyzer 120 for estimating a tread wear rate of a tire by quantifying irregularity of an acceleration signal using a processed signal that is a signal filtered through the broad pass filter; a transmitter 130 for receiving analysis information, which is information on the tread wear rate of the tire, from the signal analyzer 120 and transmitting the received analysis information; and a control module 200 for receiving the analysis information from the transmitter 130 and generating a control signal for a vehicle to which a tire is installed.

Here, a measurement module 100 may be formed by combining the signal receiver 110, the signal analyzer 120, and the transmitter 130, and the measurement module 100 may be formed by being connected to each tire installed to the vehicle or may be formed by being connected to every tire installed to the vehicle.

In addition, the control module 200 includes a vehicle controller 210 for controlling a vehicle and an information transmitter 220 for receiving analysis information from the transmitter 130 and transmitting the received analysis information to the vehicle controller 210, and the vehicle controller 210 may determine a tire replacement time using the analysis information. In addition, the control module 200 may further include a display 230 for displaying a tire replacement time or information on a service of replacing the tire.

The signal receiver 110 may include a plurality of acceleration sensors, and each of the plurality of acceleration sensors may measure acceleration in an axial direction of each of a plurality of points inside a tire tread. Further, a number may be sequentially assigned to each acceleration sensor, and accordingly, acceleration signals measured by the respective acceleration sensors may be sequentially collected and converted into data. In addition, in response to receiving analysis information, the transmitter 130 may transmit the analysis information to the information transmitter 220 of the control module 200 wirelessly or by wire. To this end, the information transmitter 220 may be connected to the transmitter 130 wirelessly or by wire.

The vehicle controller 210 may be wirelessly connected to an integrated control system outside the vehicle while controlling the vehicle. In the vehicle controller 210, replacement time information, which is information on a scheduled tire replacement time according to a tire wear rate, may be stored in advance, and the vehicle controller 210 may compare the replacement time information with the tire wear rate in real time to determine information on a remaining time for tire replacement, the tire replacement time, and the like. In addition, the vehicle controller 210 may transmit the information on the remaining tile for tire replacement, the tire replacement time, and the like to the integrated control system. Using the information transmitted from the vehicle controller 210, the integrated control system may transmit, to the vehicle controller 210, information on a tire replacement service such as a quantity of tires stocked at a replacement time of a tire installed to the vehicle, a tire replacement repair center, and the like. The vehicle controller 210 may transmit the information on the tire replacement service to the display 230, and such information may be displayed on the display 230. In addition, even the information on the remaining time for tire replacement and the tire replacement time, which is generated by the vehicle controller 210, may also be displayed on the display 230 and informed to a user.

The signal analyzer 120 may quantify irregularity of an acceleration signal by quantifying a processed signal using [Equation 1] according to Euclidean distance analysis.

$$U = \sqrt{\sum_{i=1}^{n}(x_{i,j} - x_{i,j-1})}$$ [Equation 1]

Here, U is a number of Euclidean distances; n is a natural number which is equal to or greater than 1 and which indicates a total number of points at which an acceleration is measured inside a tire while the tire is rotating; i is an order number for the plurality of points where an acceleration is measured inside the tire; and j is the number of rotation of the tire. When the number of Euclidean distances increases, the signal analyzer 120 may determine that the tread wear rate of the tire is increased. Specifically, U may be a number derived according to a Euclidean distance of the $j^{th}$ rotation of the tire.

[Equation 1] may be derived using the concept of Euclidean distance. Hereinafter, the process of deriving [Equation 1] used by the signal analyzer 120 while estimating the tread wear rate of the tire will be described.

Figure 2:
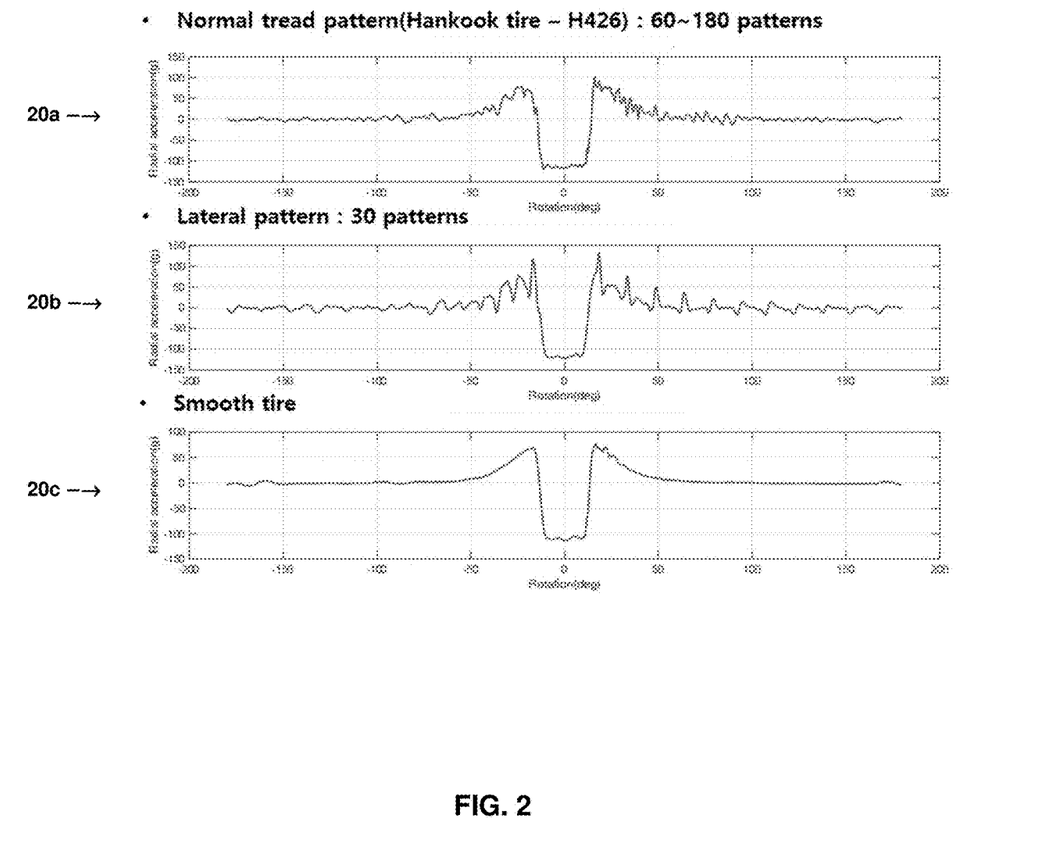
FIG. 2 is a graph showing acceleration signals measured in three types of tires.
Figure 3:
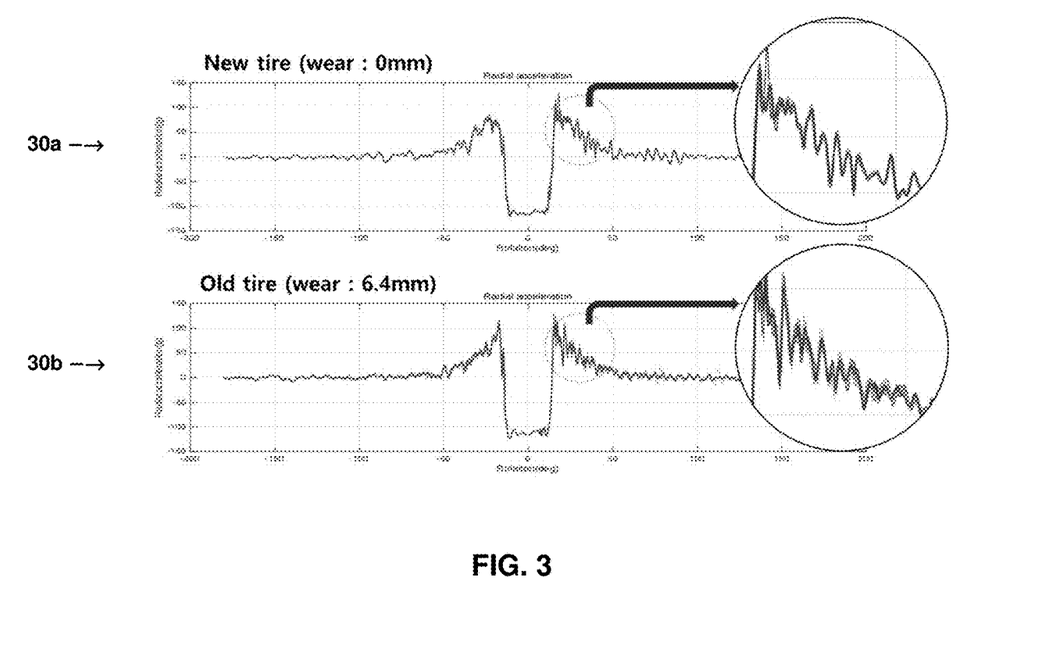
FIG. 3 is a graph showing an acceleration signal obtained for each rotation of a tire during rotation of 15 rotations according to an embodiment of the present disclosure.

FIG. 2 are graphs showing acceleration signals measured in three types of tires. Specifically, in graphs 20*a* to 20 of FIG. 2, the horizontal axis represents an angular change at an acceleration measurement point inside a tire relative to a road surface during one rotation of the tire, and the vertical axis represents an acceleration signal in an axial direction during one rotation of the tire. In addition, graph 20*a* of FIG. 2 is a graph for a tire in which 60 to 180 patterns are formed on the tread, graph 20*b* of FIG. 2 is a graph for a tire in which 30 grooves are formed in a transverse direction perpendicular to a circumferential direction of the tire, and graph 20*c* of FIG. 2 is a graph for a smooth tire without grooves. As shown in FIG. 3, it can be seen that as patterns formed in the tire decreases, the acceleration signal characteristic of the tire changes.

In the present disclosure, it is intended to estimate a tread wear rate of the tire using a change in tire acceleration signal characteristics in accordance with a change in a tread pattern area of the tire caused by the wear described above.

FIG. 3 are graphs showing acceleration signals obtained for each rotation of a tire during 15 rotations according to an embodiment of the present disclosure. In graph 30*a* and graph 30*b* of FIG. 3, the horizontal axis represents an angular change at an acceleration measurement point inside a tire with respect to a road surface during one rotation of the tire, and the vertical axis represents an acceleration signal in an axial direction during one rotation of the tire. In addition, graph 30*a* of FIG. 3 is a graph for a tire that has not been worn (new tire), and graph 30*b* of FIG. 3 is a graph for an old tire that has been worn.

As shown in graph 30*a* of FIG. 3, in the graph of an acceleration signal for the tire which has not been worn, residual vibrations (60 to 180 vibrations/rotation) appears very regularly even when an acceleration signal data graph for multiple rotations of the tire is overlapped.

On the other hand, as shown in graph 30*b* of FIG. 3, in the graph of an acceleration signal for an old tire which is relatively worn, when the acceleration signal data graph for multiple rotations of the tire is overlapped, it can be seen that regularity of high frequency vibrations is broken and irregularity is increased.

Without being bound to any theory, such tendency of the acceleration signal according to the tread wear of the tire may have the following physical meaning. As the tread wear of the tire progresses, the tread thickness of the tire decreases, and the patterns formed in the tread may gradually fade. The decrease in thickness of the tread as the wear of the tread progresses may cause various physical phenomena. First, responsiveness to external factors such as a road surface condition and tire noise increases. Second, as the thickness of the tread decreases, vibration characteristics of tire steel belts, tire liners, and the like, which are components having relatively high hardness, may be reflected in signals of the acceleration sensor. Accordingly, high frequency vibration characteristics may be reflected in signals of the acceleration sensor of the tire. In conclusion, as the tread wear of the tire progresses due to the above physical phenomena, irregularity of residual vibration of the tire may increase.

Figure 4:
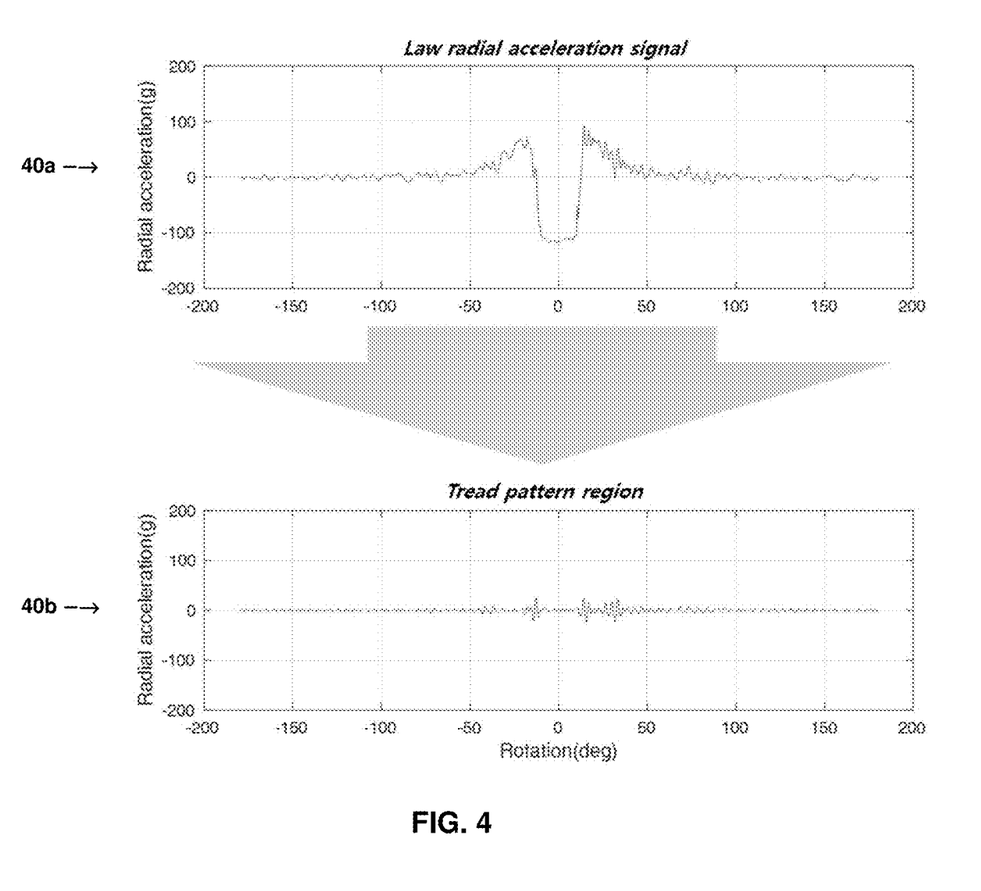
FIG. 4 is a graph showing filtering of an acceleration signal of a tire according to an embodiment of the present disclosure.
Figure 5:
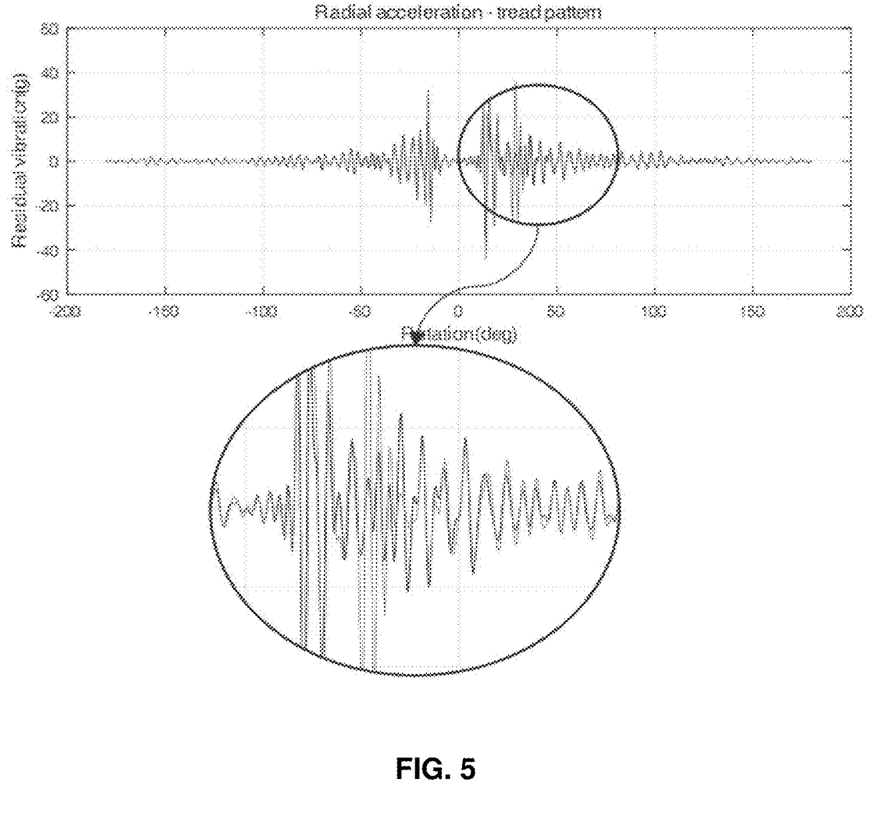
FIG. 5 is a graph of comparing one processed signal and another processed signal when a tire rotates, according to an exemplary embodiment of the present disclosure.

FIG. 4 are graphs showing filtering of an acceleration signal of a tire according to an embodiment of the present disclosure. In FIG. 4, graph 40*a* is a graph showing an acceleration signal of a tire before filtering, and graph 40*b* is a graph showing a processed signal that is a tire acceleration signal after filtering. FIG. 5 is a graph of comparing one processed signal and another processed signal when a tire rotates, according to an exemplary embodiment of the present disclosure. Specifically, it is a graph of comparison by extracting high-frequency vibration data from each data when the tire rotates and the data of $j-1^{th}$ wheel and the $j^{th}$ axial acceleration signal exist. In graph 40*a* and graph 40*b* of FIG. 4, and FIG. 5, the horizontal axis represents an angular change at an acceleration measurement point inside a tire relative to a road surface during one rotation of the tire, and the vertical axis represents an axial acceleration signal during one rotation of the tire.

As shown in FIG. 4, when a preprocessing is performed by performing filtering on the acceleration signal of the tire, only residual vibration may be extracted from the acceleration signal reflecting the residual vibration and used for analysis.

In addition, the concept of Euclidean distance may be used by quantifying irregularity of the residual vibration, and accordingly, [Equation 1] described above may be derived. In addition, as shown in FIG. 5, when the tire rotates, a distance is made for each high-frequency vibration signals extracted when the $j-1^{th}$ wheel data and the $j^{th}$ axial acceleration signal exist, and irregularity between such two types of data may be quantified as a square root of the sum of squares of intervals of the two types of data using [Equation 1]. Also, as described above, as tire wear progresses, the irregularity of the high-frequency vibration due to the tire acceleration signal increases, and as the irregularity of the high-frequency vibration increases, the number of Euclidean distances increases. As a result, when the number of Euclidean distances increases, the signal analyzer 120 may determine that a tread wear rate of the tire is increased. In addition, the signal analyzer 120 may derive the tread wear rate of the tire according to the number of Euclidean distances using FIGS. 6 and 7, and a tread wear amount (wear thickness, mm) of the tire may be calculated using the thread wear rate.

Figure 6:
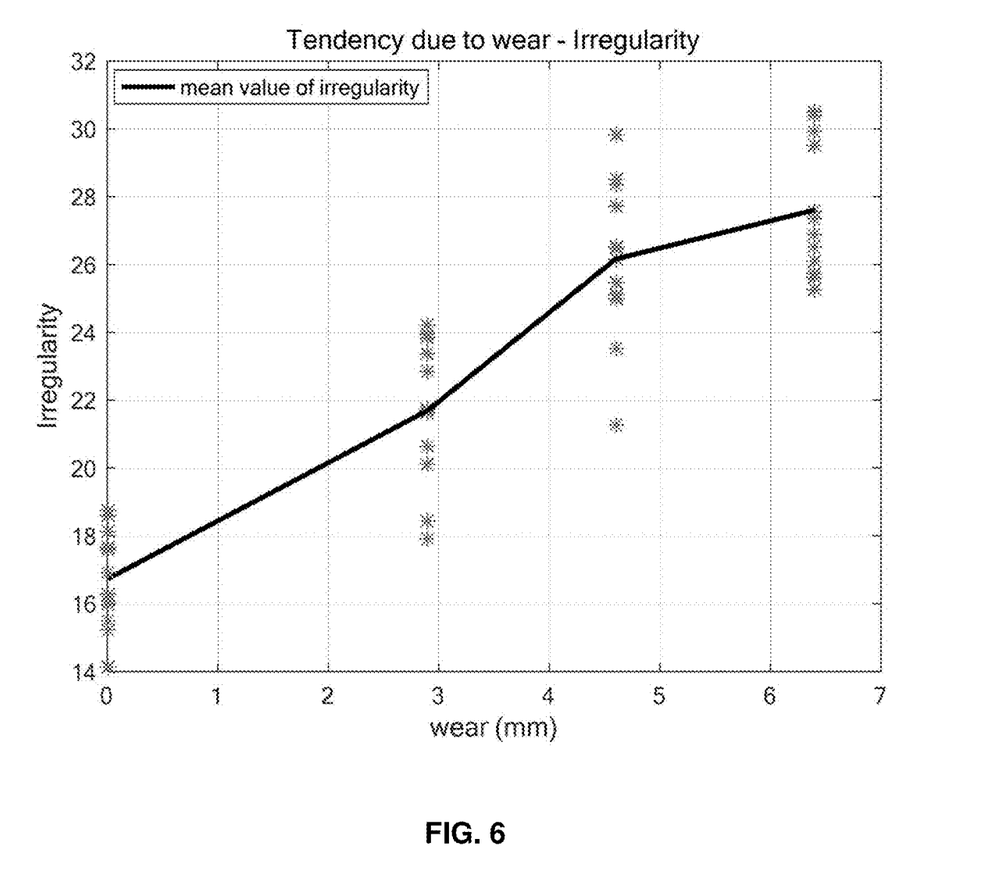
FIG. 6 is a graph showing tendency of the number of Euclidean distances according to tread wear of a tire according to an embodiment of the present disclosure.
Figure 7:
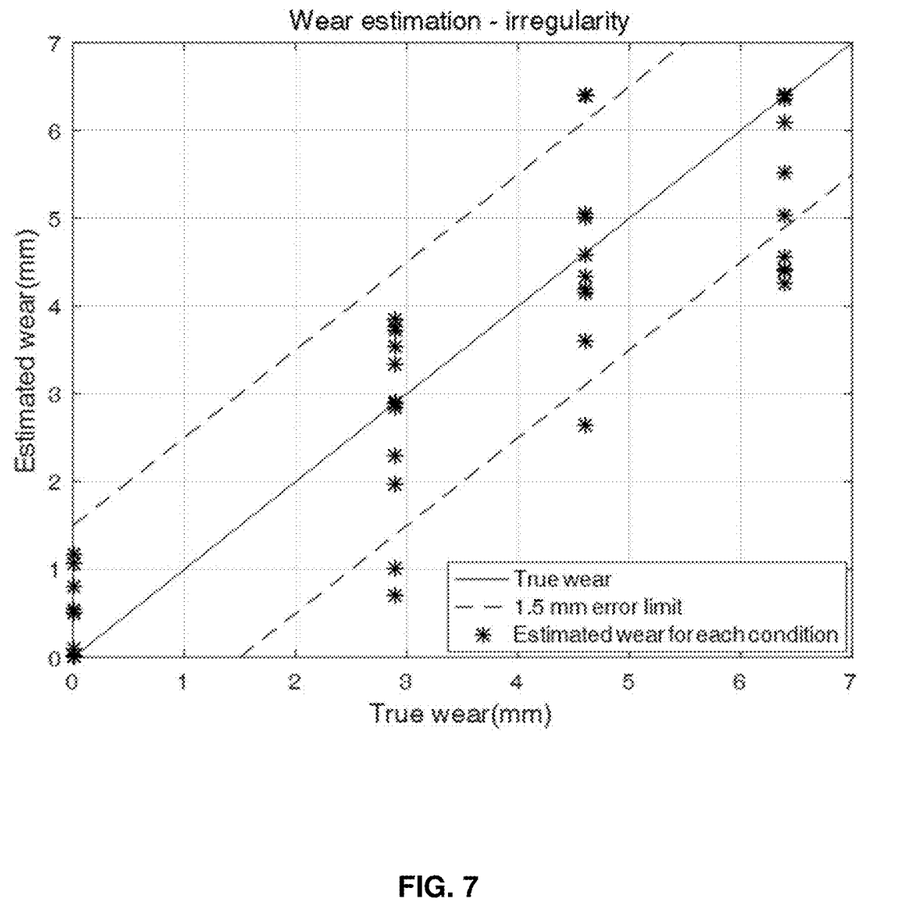
FIG. 7 is a graph showing a wear amount of a tire calculated according to an embodiment of the present disclosure and a true wear amount of the tire.

FIG. 6 is a graph showing tendency of the number of Euclidean distances according to tread wear of a tire according to an embodiment of the present disclosure. In FIG. 6, the horizontal axis represents a tread wear amount (wear thickness) of the tire, and the vertical axis represents irregularity using the number of Euclidean distances. FIG. 7 is a graph showing a wear amount of a tire calculated according to an embodiment of the present disclosure and an actual wear amount of the tire. Specifically, in FIG. 7, the horizontal axis may represent the actual thread wear amount of the tire, and the vertical axis may represent the tread wear amount of the tire calculated by the signal analyzer 120.

As shown in FIGS. 6 and 7, quantified irregularity for various conditions of a tire may be compared and analyzed, and specifically, while changing pressure, load, velocity, and the like of a tire, comparative analysis is conducted for a total of 12 conditions (3 load conditions×4 pressure conditions) for each tire wear stage. Here, each point shows the results of various conditions, and each solid line may be a graph formed by connecting the average value of each point for each amount of wear.

As can be seen from the results of FIGS. 6 and 7, as the tread wear of the tire increases, irregularity of the acceleration sensor signal, that is, the number of Euclidean distances, increases. In addition, in the case of wear estimation based only on the irregularity of the tire acceleration signal, estimation performance may be found for all wear levels.

According to the above configuration, it is possible to measure an acceleration signal of a tire using an acceleration sensor, extract high-frequency vibration of the tire from the acceleration signal, and estimate a tread wear rate of the tire by analyzing the high-frequency vibration, and therefore, a wear amount of the tire may be measured in real time. In addition, it is possible to share information on the wear amount of the tire not only with a vehicle user but also with an integrated control system, and therefore, an automatic service for replacement of the tire may be implemented.

Hereinafter, a tire wear measuring method using a tire wear measuring apparatus of the present disclosure will be described.

In a first step, acceleration inside a tire with respect to an axial direction may be measured for each of a plurality of points inside the tire. In the second step, filtering is performed as a preprocessing on an acceleration signal to generate a processed signal. In a third step, a tread wear rate of the tire may be estimated by quantifying irregularity of the acceleration signal using the processed signal. In a fourth step, the replacement time of the tire may be determined using information on the tread wear rate of the tire. In a fifth step, information on the replacement time of the tire may be transmitted to a user of a vehicle and an external integrated control system connected to the vehicle.

A description on what is not described in relation to the tire wear measuring method using the tire wear measuring apparatus of the present disclosure may be the same as the above description about the tire wear measuring apparatus of the present disclosure.

The present disclosure according to the above configuration has advantageous effects that it is possible to measure an acceleration signal of a tire using an acceleration sensor, extract high-frequency vibration of the tire from the acceleration signal, and estimate a tread wear rate of the tire by analyzing the high-frequency vibration, thereby measuring a wear amount of the tire in real time.

In addition, the present disclosure has advantageous effects that information on the wear amount of the tire is shared not only with the user of the vehicle but also with the integrated control system, thereby implementing an automatic service for replacement of the tire.

The effects of the present disclosure are not limited to the above-mentioned effects, and it should be understood that the effects of the present disclosure include all effects that can be inferred from the configuration of the invention described in the detailed description of the invention or the appended claims.

The above description of the example embodiments is provided for the purpose of illustration, and it would be understood by those skilled in the art that various changes and modifications may be made without changing the technical conception and essential features of the embodiments. Thus, it is clear that the above-described embodiments are illustrative in all aspects and do not limit the present disclosure. It will be appreciated that each of the processes, methods, and algorithms such as modules, analyzers and controllers described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. In some embodiments, particular operations and methods may be performed by circuitry that is specific to a given function.

The scope of the inventive concept is defined by the following claims, and it shall be understood that all modifications and embodiments conceived from the meaning and scope of the claims and their equivalents are included in the scope of the present disclosure.

What is claimed is:

1. An apparatus for measuring tire wear, the apparatus comprising:
   a signal receiver comprising a plurality of acceleration sensors installed at a plurality of points inside the tire;
   the signal receiver configured to measure an acceleration, at each point inside the tire, with respect to an axial direction corresponding to a radial direction of the tire;
   a broad pass filter configured to receive a measured acceleration signal from the signal receiver and perform filtering as a preprocessing on the acceleration signal to generate a processed signal;
   a signal analyzer configured to estimate a tread wear rate of the tire by quantifying an irregularity of the acceleration signal using the processed signal that is a signal filtered through the broad pass filter;
   a transmitter configured to receive analysis information comprising information on the tread wear rate of the tire, from the signal analyzer and transmit the analysis information; and
   a control module configured to receive the analysis information from the transmitter and generate a control signal for a vehicle on which the tire is installed.

2. The apparatus of claim 1, wherein the control module comprises:
   a vehicle controller configured to control the vehicle; and
   an information transmitter configured to receive the analysis information from the transmitter and transmit the analysis information to the vehicle controller, wherein the vehicle controller is further configured to determine a replacement time of the tire using the analysis information.

3. The apparatus of claim 2, wherein the control module further comprises a display configured to display the replacement time of the tire or information on a service of replacing the tire.

4. The apparatus of claim 1, wherein the signal analyzer is configured to quantify the irregularity of the acceleration signal using an analysis of Euclidean distances between the plurality of points.

5. An apparatus for measuring tire wear, the apparatus comprising:
   a signal receiver configured to measure an acceleration inside a tire, with respect to an axial direction corresponding to a radial direction of the tire, at a plurality of points inside the tire;
   a broad pass filter configured to receive a measured acceleration signal from the signal receiver and perform filtering as a preprocessing on the acceleration signal to generate a processed signal;
   a signal analyzer configured to estimate a tread wear rate of the tire by quantifying an irregularity of the acceleration signal using the processed signal that is a signal filtered through the broad pass filter;
   a transmitter configured to receive analysis information comprising information on the tread wear rate of the tire, from the signal analyzer and transmit the analysis information; and a control module configured to receive the analysis information from the transmitter and generate a control signal for a vehicle on which the tire is installed,
wherein the signal analyzer is configured to quantify the irregularity of the acceleration signal using the following equation according to an Euclidean distance analysis:

$$U=\sqrt{\Sigma_{i=1}^{n}(x_{i,j}-x_{i,j-1})},$$

where U is a number of Euclidean distances; n is a natural number which is equal to or greater than 1 and which indicates a total number of points at which the acceleration is measured inside the tire while the tire is rotating; i is an order number for each point at which the acceleration is measured inside the tire; and j is a number of rotations of the tire.

6. The apparatus of claim 5, wherein the signal analyzer is further configured to determine a tread wear rate of the tire that has increased when the number of Euclidean distances increases.

7. The apparatus of claim 5, wherein the control module comprises:
a vehicle controller configured to control the vehicle; and
an information transmitter configured to receive the analysis information from the transmitter and transmit the analysis information to the vehicle controller,
wherein the vehicle controller is further configured to determine a replacement time of the tire using the analysis information.

8. The apparatus of claim 7, wherein the control module further comprises a display configured to display the replacement time of the tire or information on a service of replacing the tire.

9. A method of measuring a tire wear using the apparatus of claim 1, the method comprising:
measuring the acceleration inside the tire with respect to the axial direction at the plurality of points inside the tire;
generating the processed signal by performing filtering as the preprocessing on the acceleration signal;
estimating the tread wear rate of the tire by quantifying the irregularity of the acceleration signal using the processed signal;
determining a replacement time of the tire using information on the tread wear rate of the tire; and
transmitting information on the replacement time of the tire to a user of the vehicle and an external integrated control system connected to the vehicle.

10. A method of measuring a tire wear using the apparatus of claim 5, the method comprising:
measuring the acceleration inside the tire with respect to the axial direction at the plurality of points inside the tire;
generating the processed signal by performing filtering as the preprocessing on the acceleration signal;
estimating the tread wear rate of the tire by quantifying the irregularity of the acceleration signal using the processed signal;
determining a replacement time of the tire using information on the tread wear rate of the tire; and
transmitting information on the replacement time of the tire to a user of the vehicle and an external integrated control system connected to the vehicle.

* * * * *